[redacted]

L. E. Sperry

Hammer Cutter.

No. 14

Patented April 22 1856

BEST AVAILABLE COPY

Fig 1

Fig 2

BEST AVAILABLE COPY

UNITED STATES PATENT OFFICE.

GEORGE ESTERLY, OF HEART PRAIRIE, WISCONSIN.

IMPROVEMENT IN GRASS-HARVESTERS.

Specification forming part of Additional Improvement No. 141, dated April 22, 1856, to Letters Patent No. 11,155, dated June 27, 1854.

*To all whom it may concern:*

Be it known that I, GEORGE ESTERLY, of Heart Prairie, in the county of Walworth and State of Wisconsin, have invented or discovered an additional improvement to the patent granted to me on the 27th day of June, 1854; and I do hereby declare the following to be a full, clear, and exact description of said improvement, reference being had to the accompanying drawings, in which—

Figure 1 represents the sickle and bar as constructed and used under my patent as aforesaid, and Fig. 2 represents my improved plan of making and using it.

In my patent of the 27th of June, 1854, I described and represented the sickle-bar as placed underneath the sections or cutting-blades, as shown in Fig. 1. The tendency of the cutter when thus placed underneath the sections is to raise the edge of the sickle from the fingers. There must of necessity be a groove for the sickle-bar to work in, and the weight of the bar, when placed on the under side, cants up the fronts or points of the sections, and thus detracts from the efficiency of the cutting-edges.

The nature of my additional improvement consists in transposing the bar and sections—that is to say, instead of placing the bar below the sections I place it on top of the sections, as shown in Fig. 2, in which figure, as in Fig. 1, the bar is represented at L and the sections at A. By placing the bar L on top of the sections and using fingers with a plain surface on the upper side the weight of said bar will tend to hold the edges of the sections down in their proper places, and the projections A′, behind the bar, as shown in Fig. 2, will operate as clearers.

I do not introduce any new parts, or take away any of those represented in my patent to which I desire to add this improvement, but merely transpose the parts to overcome the objection which practice has pointed out in the former plan.

Having thus fully described the nature of my additional improvement and shown the object to be gained thereby, what I claim as new in the construction of the sickle, and desire to secure by addition to my patent of the 27th of June, 1854, is—

Connecting the projections A, which are on alternate sections of the sickle, to the bar L, so that the said bar may be on top of said sections, as herein set forth.

GEO. ESTERLY.

Witnesses:

A. B. STOUGHTON,

THOS. H. UPPERMAN.